(12) United States Patent
Michalek et al.

(10) Patent No.: US 8,409,481 B2
(45) Date of Patent: Apr. 2, 2013

(54) METHOD OF MANUFACTURING AN IMPLANTABLE INTRAOCULAR PLANAR/CONVEX, BICONVEX, PLANAR/CONCAVE OR CONVEX/CONCAVE LENS AND A LENS MADE USING THIS METHOD

(75) Inventors: Jiri Michalek, Prague (CZ); Jiri Vacik, Prague (CZ)

(73) Assignee: S.K.Y. Polymers, Inc., Pittsburgh, PA (US)

(*) Notice: Subject to any disclaimer, the term of this patent is extended or adjusted under 35 U.S.C. 154(b) by 0 days.

(21) Appl. No.: 12/980,701

(22) Filed: Dec. 29, 2010

(65) Prior Publication Data
US 2011/0093067 A1 Apr. 21, 2011

Related U.S. Application Data

(62) Division of application No. 11/721,075, filed as application No. PCT/CZ2005/000093 on Dec. 9, 2005.

(30) Foreign Application Priority Data

Dec. 10, 2004 (CZ) .............................. PV 2004-1205

(51) Int. Cl.
*B29C 41/04* (2006.01)
(52) U.S. Cl. .................. 264/2.1; 264/1.36; 425/808
(58) Field of Classification Search .................... 264/2.1
See application file for complete search history.

(56) References Cited

U.S. PATENT DOCUMENTS

| | | | | |
|---|---|---|---|---|
| 3,660,545 A | * | 5/1972 | Wichterle | 264/2.1 |
| 4,534,915 A | * | 8/1985 | Neefe | 264/1.38 |
| 4,971,732 A | * | 11/1990 | Wichterle | 264/1.1 |

* cited by examiner

*Primary Examiner* — Yogendra Gupta
*Assistant Examiner* — Alison Hindenlang
(74) *Attorney, Agent, or Firm* — Fox Rothschild LLP; Gerard P. Norton; Glenn M. Massina (57) ABSTRACT

A method of manufacturing an implantable lens from liquid polymer precursor in an open mold includes metering the liquid into the mold in a measured amount that comes into contact with a functional shaping inner surface of the mold located under a peripheral circular sharp edge of the stationary mold or which reaches up to this peripheral circular sharp edge, at which point the open mold is rotated around it's vertical axis at a speed at which the edge of the surface of the liquid polymer precursor reaches the peripheral circular sharp edge of the open mold, after which the liquid polymer precursor is exposed to conditions under which it transforms itself into a state of a clear solid polymer by polymerization and/or cross-linking, until the transition is attained, and then the implantable intraocular lens is removed from the mold.

18 Claims, 5 Drawing Sheets

METHOD OF MANUFACTURING AN IMPLANTABLE INTRAOCULAR PLANAR/CONVEX, BICONVEX, PLANAR/CONCAVE OR CONVEX/CONCAVE LENS AND A LENS MADE USING THIS METHOD

CROSS-REFERENCE TO RELATED APPLICATIONS

This is a divisional of U.S. patent application Ser. No. 11/721,075 filed Jun. 7, 2007 which is a 371 application of PCT/CZ2005/000093 filed Dec. 9, 2005, which are both incorporated herein by reference, and which claims priority on Czech patent application PV 2004-1205 filed Dec. 10, 2004, which priority claim is repeated here.

FIELD OF THE INVENTION

The invention addresses a method of manufacture of an implantable intraocular planar/convex, biconvex, planar/concave or convex/concave lens, an open mold used for the execution of this method, and a lens made using this method.

BACKGROUND OF THE INVENTION

Intraocular lenses are lenses implantable into the eye for the purpose of the change of correction. They can be implanted into various parts of the eye, such as the posterior chamber, anterior chamber, or stroma. Intraocular lenses are made of material of various rigidity. In case of hard materials, such as certain poly(alkylmethacrylate)s, especially polymethylmethacrylate, or dehydrated hydrogels, also called xerogels, the most common manufacturing process is lathe machining with subsequent polishing. Soft intraocular lenses are usually made by casting in appropriate molds. Casting is based on filling the mold with a liquid polymer precursor, such as for instance a mixture of specific monomers, a melted polymer, or a liquid pre-polymer with a cross-linking capability, and on the subsequent conversion of this material into a solid state, known as solidification. In case of soft materials for intraocular lenses, this solidification generally includes cross-linking, i.e. the formation of a three-dimensional covalent network, which stabilizes the shape of the lens. For example, this network can be formed by either the copolymerization of bi-functional monomers with multi-functional cross-linking co-monomers, known as cross-linking agents or cross-linkers, or the additional cross-linking of the liquid polymer.

The transition from a liquid to a solid state is accompanied by a greater or lesser volumetric contraction, which greatly complicates the casting of the product, for which a great shape accuracy is required, such as in case of intraocular lenses.

The casting process can be realized relatively easily using liquid precursors, in whose case cross-linking results in a small volumetric contraction. An example of such liquid precursors are silicon rubbers.

Most contemporary intraocular lenses is based on the cross-linking of acrylic or methacrylic polymers, however, which are generally made using cross-linking copolymerization of a mixture of acrylic and/or methacrylic monomers. Such monomer mixture contains at least one type of a monomer with one polymerizable double bond, representing basic monomer or monomers, and at least one type of a monomer with two or more copolymerizable double bonds, representing the cross-linking co-monomer or co-monomers.

Basic monomers form the main polymer chain in course of polymerization, while the cross-linking co-monomers form covalent bridges between the chains. The result of this copolymerization is the formation of a three-dimensional network, which is non-meltable and insoluble in any solvent. The process described above is often used in case of hydrogels.

If, for example, the basic monomer is 2-hydrozyethyl-methacrylate copolymerized with a small amount, usually no more than 2% molar, of ethylendimethacrylate functioning as a cross-linker, it will form a cross-linked poly(hydroxyethyl-methacrylate). Such hydrogels are described, for example, in the U.S. Pat. Nos. 2,976,576 and 3,220,960, and are the basis for many contact lenses and various implants, including intraocular lenses.

Ophthalmic lenses are made using various shaping processes, for example polymerization in closed molds. Closed molds are not particularly suitable for cross-linking copolymerization, however, which is followed by a significant volumetric contraction amounting to up to 20% of the volume. If the volume of the closed mold cavity is constant, then the contraction results in the decrease of pressure within the molds, which has many undesirable consequences, particularly the formation of cavities, bubbles, vacuoles, and surface defects. The contraction during solidification is a common problem in the shaping of plastics, which is solved in various ways, for instance gradual addition of additional liquid precursor, by which the loss of pressure due to contraction is compensated, such as during injection molding of thermoplastic resins.

This technique is practically unusable in case of cross-linking copolymerization, however, because the gel point, which is a state at which the three-dimensional network is created and the flow capability of the copolymerized product is halted, is here reached at very low degrees of conversion. A significant contraction occurs at the point where it is not possible to add further liquid precursor.

These difficulties during cross-linking copolymerization in closed molds led to the search for alternative casting technologies. The casting of optical components, such as ophthalmic lenses, requires an extremely good shape definition, excellent surface quality, and material homogeneity, in other words qualities unattainable if the overpressure in the cavity of the closed mold is not maintained. The patent literature shows many proposed solutions to this problem. One of these is the casting while the mold is rotating, which is known under it's original name "spin-casting", and which was, for example, proposed for the production of hydrogel contact lenses in the U.S. Pat. Nos. 3,660,545, 4,517,138, 4,517,139, 4,517,140 and 4,551,086. This technique is used for the manufacture of contact lenses using an open concave mold, provided with a sharp edge forming the boundary of the form. The mold is filled with a small volume of a monomer mixture, which is significantly smaller than the volume of the concave cavity of the mold. The level of liquid monomer mixture is, in this case, always deep under the plane of the sharp mold edge. Due to the mold rotation around the vertical axis of symmetry of the mold cavity, the liquid monomer mixture will spread to form a concave shape, approaching a paraboloid. The result is a convex/concave lens, whose central thickness is very low, which means that it is significantly lower than the sagital depth of the mold cavity. This shape is especially appropriate for hydrogel contact lenses. The speed of mold rotation for the manufacture of contact lenses typically lies between 300 and 500 rpm, with the mold cavity diameter in the plane of it's sharp edge typically being between 13 and 17 mm.

Another known use of rotational casting is the formation of parabolic mirrors for telescopes and other instruments requiring precise focusing. In these cases, the goal is the creation of parabolic optical surfaces with a single focus for coaxial rays and without spherical aberration.

The U.S. Pat. No. 3,691,263 describes a different method of rotational casting, where the casting of contact lenses is done without the use of molds. It involves the polymerization of liquid monomers on the surface of a rotating carrier liquid, which is non-miscible with polymerizing liquid monomers, which has a higher density than polymerizable liquid monomers, and which is for example mercury or a concentrated saline solution.

Another modification of this process uses monomer polymerization on the interface of two rotating non-miscible liquids, of which one has higher and the other one has a lower density than the starting monomer and the resulting polymer.

The U.S. Pat. No. 4,806,287 describes a method of lens manufacture using hydrophilic gels. This method is based upon the solidification of a droplet of a monomer under a non-miscible liquid, such as oil, while at least the optical zone of the lens is formed between a mold and an appropriately shaped plunger. One option mentioned is also mold rotation, where the mold rotation does not affect the optical zone of the lens, which is defined by the shape of the plunger, but it affects only the peripheral parts of the molding. For that reason, this lens cannot be considered a rotationally-cast lens.

Rotational casting on liquid surfaces of a high specific gravity can be also used for the casting of precise tubing made of cross-linked polymers, as described by the Czech patent CZ 153760.

So far, rotational casting has not been utilized for the production of intraocular lenses for several reasons. First of all, most intraocular lenses made until now has a relatively small diameter, which is usually equal to no more than 6 mm. It was assumed that centrifugal casting would have only a limited effect on the shape of the lens for such diameters, because the centrifugal force increases with the square of the distance from the rotation axis. Beside that, intraocular lenses are generally biconvex, or less frequently planar-convex lenses, and rotational casting has been up to date used only for lenses which are distinctly convex/concave lenses, such as in the case of contact lenses. Finally, contemporarily manufactured intraocular lenses often have complex shapes of a non-circular footprint, with the optical zone and integral haptics for centering the lens in the eye. Such shapes with non-circular shape are not suitable to rotational casting in open molds. Due to the reasons listed above, rotational casting of intraocular lenses has been until now considered unfeasible by the experts in the field.

Until now, intraocular lenses have been made using casting into open stationary molds, where the meniscus formed by the liquid monomer defined the shape of one of the optical surfaces. These methods are described in the U.S. Pat. Nos. 4,971,732, 4,846,832, and 5,674,283. According to the U.S. Pat. No. 4,971,732 the liquid monomer mixture is metered into a concave cavity provided with a sharp edge forming the boundary of the cavity. The material from which the mold is made is poorly wettable by the monomer mixture. The volume of the liquid monomer mixture dosed into the mold must be equal or preferentially higher than the volume of the mold cavity, so that the level of the liquid monomer mixture will reach up to the sharp edge of the mold. If the amount of the liquid monomer mixture is insufficient is insufficient in this respect, the liquid filling the mold cavity will retract away from the sharp edge due to polymerization contraction; therefore it is impossible to obtain a quality product in this case. Therefore it is beneficial to increase the metered volume of the liquid monomer mixture and thus attain a higher menis-cus. The volumetric excess of the monomer in respect to the mold cavity volume and thus also the height of the meniscus affect the optical power of the lens. For this reason, it is possible to create lenses of various optical power using one mold, by metering various volumes of liquid monomer mixture into the cavity.

A typical product of this process is a biconvex intraocular lens with a diameter over 9 mm, central thickness 2.5 to 6.3 mm, frontal optical surface in the shape of a flat ellipsoid with a center radius from 7.5 to 15 mm, rotationally symmetrical rear optical surface with a center radius from 5 to 8 mm and toric transitional zone between both optical surfaces.

This typical product has several disadvantages. First, the central thickness and the overall lens volume are too high for a small-incision implantation, which is required by today's surgeons. Secondly, the front optical surface in the shape of a flat ellipsoid is not advantageous, because it has a high spherical aberration. Furthermore, this surface is often unevenly deformed by the polymerization in various parts of the monomer mixture proceeded at various rates, therefore the contraction was not entirely uniform. This is a general disadvantage of static polymerization casting in open molds.

The U.S. Pat. No. 4,846,832 describes a soft biconvex intraocular lens with a rear convex surface formed by the solidification of liquid meniscus, while the front surface has a central convex zone with a diameter of 4 to 8 mm. The central zone is surrounded by the concave surface of a relatively thin peripheral zone. The front side of the lens is therefore created by the imprint of the mold with a concave optical center zone and a sharp circular rim at the edge. Since the rear side is formed by a solidified meniscus of the liquid, it probably also has the shape of a flat ellipsoid and therefore also has a high spherical aberration. Intraocular lenses can be manufactured using this method either using silicone rubber, or a cross-linked hydrogel with a relatively high index of refraction at 1.42 to 1.43.

The U.S. Pat. No. 5,674,283 describes an intraocular lens in the shape of a saucer with a biconvex optical zone, similar to the product of the preceding method, but made using a different method. The main difference is that in case of a lens made according to the U.S. Pat. No. 5,674,283 the rear side of the lens is shaped by the cavity of the mold, while the front side of the lens is shaped by the meniscus of the monomer, i.e. like in case of a lens made using the method in U.S. Pat. No. 4,971,732, and conversely of the lens made according to the method described in the U.S. Pat. No. 4,846,832. This method is a modification of the method according to the U.S. Pat. No. 4,846,832 with the difference that the optical surface creation by the use of the meniscus is used only in the central area of the lens. This method uses a two part form, where the top part of the mold has a central circular window, in which the meniscus of the liquid monomer is formed. The diameter of the optical zone is substantially smaller than the diameter of the whole lens.

The goal of the invention is to improve the production of intraocular lenses, which has been until now done using stationary casting in open molds, described in the U.S. Pat. Nos. 4,971,732, 4,846,832 and 5,674,283, and thus obtain a wider selection of attainable shapes and optical power values, improvement of optical quality, and increase of production yield of intraocular lenses. In the framework of the invention, the technical prejudice according to which centrifugal casting was deemed unusable for the production of intraocular lenses by the technical community, has been overcome, and with a surprise the reverse has been found, that under the conditions defined by the invention it was possible to produce intraocular lenses of required quality using centrifugal casting. Even though the centrifugal casting, used within the framework of the invention, was originally developed for contact lenses, the conditions for the production of intraocular lenses according to the invention and the hitherto used conditions for the production of contact lenses are entirely different and not deducible from one another, because the conditions, which are suitable for intraocular lenses, are not usable for contact lenses, and vice versa. The method according to the invention differs from the current state of technology even by technical problems, which it solves. While in case of implantable intraocular lenses the invention solves problems of stationary casting in open molds and the removal of some of its' shortcoming, the spin casting of contact lenses did not originate in stationary casting in open molds, because contact lenses cannot be made by stationary casting in open molds at all, and casting while rotating in case of contact lenses thus did not attempt to solve technical problems of stationary casting, but it solved entirely different set of technical problems, which are problems associated with contraction in closed molds. In the scope of this invention it was discovered, that implantable intraocular lenses can be advantageously manufactured by rotational casting under conditions specified below, while the result of the method according to the invention is, furthermore, an implantable intraocular lens with a unique configuration and useful characteristics.

SUMMARY OF THE INVENTION

The subject of the invention is a method of manufacture of an implantable intraocular planar/convex, biconvex, planar/concave or convex/concave lens made from a liquid precursor of the polymer, which is able of being transformed into a clear, solid polymer through polymerization and/or cross-linking in an open mold, the said mold having a functional shaping inner surface that is separated from the remaining surface of the open mold by a peripheral circular sharp edge, the functional shaping inner surface being unwettable or incompletely wettable by the liquid precursor, wherein the said method comprises the following steps:

a) the liquid polymer precursor is metered into the open mold in the amount, at which the edge of the surface of the liquid precursor contacting the inner surface of the open mold is located under the peripheral circular sharp edge of the open mold or reaches this peripheral circular sharp edge and at least a part of the surface of the liquid polymer precursor will protrude above the plane defined by the peripheral circular sharp edge of the open mold, or at least a part of the surface of the liquid precursor lies in this plane or the whole surface of the liquid polymer precursor lies below this plane, while in this case the liquid polymer precursor will be metered into the open mold in the amount, which will always be higher than the amount of the liquid polymer precursor needed to obtain a contact eye lens of the same diameter, b) the open mold, which contains the liquid polymer precursor, is rotated around its vertical axis at a speed, at which the edge of the surface of the liquid polymer precursor reaches to the peripheral circular sharp edge of the open mold, the liquid polymer precursor is in contact with the whole inner surface of the open mold and the surface of the liquid polymer precursor is located in the plane defined by the peripheral circular sharp edge, or finds itself above or below this plane, c) the liquid polymer precursor is exposed to conditions, under which it will be able of its transformation into a state of a clear, solid polymer by polymerization and/or cross-linking;

d) and the open mold continues to be rotated at the said speed at least until the time, when the edge of the surface of the polymerized and/or cross-linked liquid polymer precursor reaches the peripheral circular sharp edge of the open mold even if the rotation of the mold during was slowed down or stopped;

e) then the rotation of the open mold is optionally slowed down or stopped f) and the exposure of the contents of the open form to the conditions, during which its transition into clear, solid polymer state through polymerization and/or cross-linking continues at least until such time, when the said transition is attained, g) whereupon the implantable intraocular lens is removed from the open mold.

Preferably, the liquid polymer precursor contains at least one monomer with at least one double bond polymerizable by a free radical polymerization.

Preferably, the radical polymerization is initiated by the fission of initiators containing a peroxide bond or azo-bond.

Preferably, the radical polymerization will be initiated using free radicals created by the action of radioactive or electromagnetic radiation or the action of accelerated electrons.

Preferably, the monomers with at least one double bond which is polymerizable by radical polymerization are derivates of acrylic and/or methacrylic acid.

Preferably, at least one of the derivates of acrylic and/or methacrylic acid is an ester of a polyhydric compound with at least two molecules of acrylic or methacrylic acid.

Preferably, at least one of the derivates of acrylic and/or methacrylic acid is a salt of the acrylic or methacrylic acid.

Preferably, at least one of the monomers with at least one double bond polymerizable by radical polymerization contains a group capable of absorbing electromagnetic radiation in the range between 190 and 500 nm, advantageously between 300 and 400 nm.

Preferably, the group capable of absorbing electromagnetic radiation is derived from benzophenone or bentriazole.

Another subject of our invention is an open form for the implementation of the method defined above, whose concept is based upon it's containing an open concave cavity, defined by a functional shaping concave inner surface ending by a peripheral sharp edge having the shape of a circle, which lies in the plane perpendicular to the vertical axis of the open concave cavity and has a diameter of 5 to 10 mm.

Preferably, the radius of the curvature of the open concave cavity increases from the lowest value in the proximity of the vertical axis of the open concave cavity in the direction toward the peripheral circular sharp edge of the open concave cavity.

Preferably the functional shaping concave inner surface of the open concave cavity has the shape defined by the rotation of a section of a cone along the vertical axis of the open concave cavity.

The section of the cone is preferably defined by the equation $Y = -a + (a/b) \cdot (b^2 + X^2)^{0.5}$, in which $a = R_c \cdot (1+h)$, while $R_c$ is the center curvature radius and h is the parameter defining the asphericity, which is chosen from the interval from $-1$ to $+\infty$.

The parameter defining asphericity h is preferably chosen in the interval from $-0.75$ to $+1$.

The center curvature radius $R_c$ is chosen from a value in the interval from 2 to 20 mm, preferentially in the interval from 2.5 to 5 mm.

The peripheral sharp edge has preferably the shape of a circle, with a diameter from 7 to 9 mm. The open concave surface cavity preferably passes in the upper part of the open mold over an intermediate circular edge having the shape of a circle lying in the plane that is parallel to the plane of the peripheral sharp circular edge, into a transitional open cylindrical or frustum-of-a-cone cavity limited between the peripheral sharp edge and the intermediate circular edge.

Preferred height of the transitional open cylindrical or frustum-of-a-cone cavity is from 0.01 to 0.2 mm, and even more preferably from 0.03 to 0.08 mm.

The preferred volume of the open concave cavity, or optionally the combined volume of the open concave cavity and the transitional open cylindrical or frustum-of-a-cone cavity is from 15 to 175 µm, even more preferably from 25 to 55 µm.

According to the invention, the mold is preferably made of a plastic material which is not wettable or is incompletely wettable by the liquid polymer precursor.

Preferably, the mold according to the invention is made from a polyolefin.

The subject of the invention is also an implantable intraocular planar/convex, biconvex, planar/convex or convex/concave lens producible by the above defined method according to the invention, or producible in the above defined open mold according to the invention.

DESCRIPTION OF THE PREFERRED EMBODIMENTS

According to the invention, intraocular lenses can be made according to the invention from various cross-linked polymers. Within the scope of the invention, advantageous polymers are such, whose temperature of softening while in an equilibrium state with intraocular fluids is lower than the body temperature. Such polymers can be based on silicones, for example such as are described in U.S. Pat. No. 5,519,070. Further, those polymers can be hydrophobic and hydrophilic acrylic or methacrylic polymers, polyurethanes or polyureas, which are described in U.S. Pat. No. 6,165,408. Especially advantageous are hydrogels suitable for ophthalmic uses, which are, for instance, described in U.S. Pat. Nos. 2,976,576, 3,220,960, 5,224,957, 4,775,731, 4,994,083, 4,997,441, 5,002,570, 5,158,832, 5, 270, 415, 5,910,519, 5,698,636, 5,391,669, 5,674,283, 5,158,832 and 6,372,815. Of these, especially appropriate are the covalently cross-linked copolymers containing acrylic and/or methalcrylic acid and their derivatives, such as esters, amides, or salts. The most suitable are cross-linked copolymers of hydrophilic methacrylates.

At least a part of a copolymer is formed by a copolymerizable monomer able to absorb radiation of a wavelengths between 290 and 500 nanometers, preferentially between 300 and 400 nanometers. Such monomers, based for example on the derivates of benzophenone or benz-triazole are well known to experts in the field. An example are copolymers absorbing ultraviolet radiation described in U.S. Pat. No. 5,133,745.

Solidification of the liquid precursor can be accomplished by the polymerization of a mixture of basic and cross-linking monomers. Suitably, such polymerization is a radical polymerization and is initiated by either the usual free-radial initiators or by a photoinitiation mechanism. Radical polymerization can be initiated by electromagnetic radiation in various areas of the spectrum, for example in the visible radiation area, ultraviolet radiation, x-rays, or gamma radiation. Free radicals can potentially be created even by absorbance of free electrons from beta-radiation or electrons accelerated using an electrical field. Solidification can also be performed by cross-linking by liquid polymer precursors, for instance such as reactive silicone pre-polymers or polyvinylalcohol solutions. Photo-initiated polymerization or cross-linking are especially advantageous methods, and are described, for example, in U.S. Pat. Nos. 6,190,603 and 5,224,597. It is desirable that the metering of the liquid precursor is performed with the accuracy better than 1 mg, and preferably with accuracy better than 0.1 mg. The rotation of the open mold, containing the liquid polymer precursor, can be implemented using various techniques and while using various equipment, which are described in U.S. Pat. Nos. 3,660,545, 4,517,138, 4,517,139, 4,517,140 and 4,551,086. If certain components of the precursor polymer mixture are relatively volatile, it is possible to limit evaporation by keeping the mold with the liquid precursor in an enclosed system with a very small space for the gas phase while undergoing solidification. Such methods and equipment suitable for rotary casting of lenses made from volatile monomers are described in U.S. Pat. No. 4,680,149.

Figure 1:
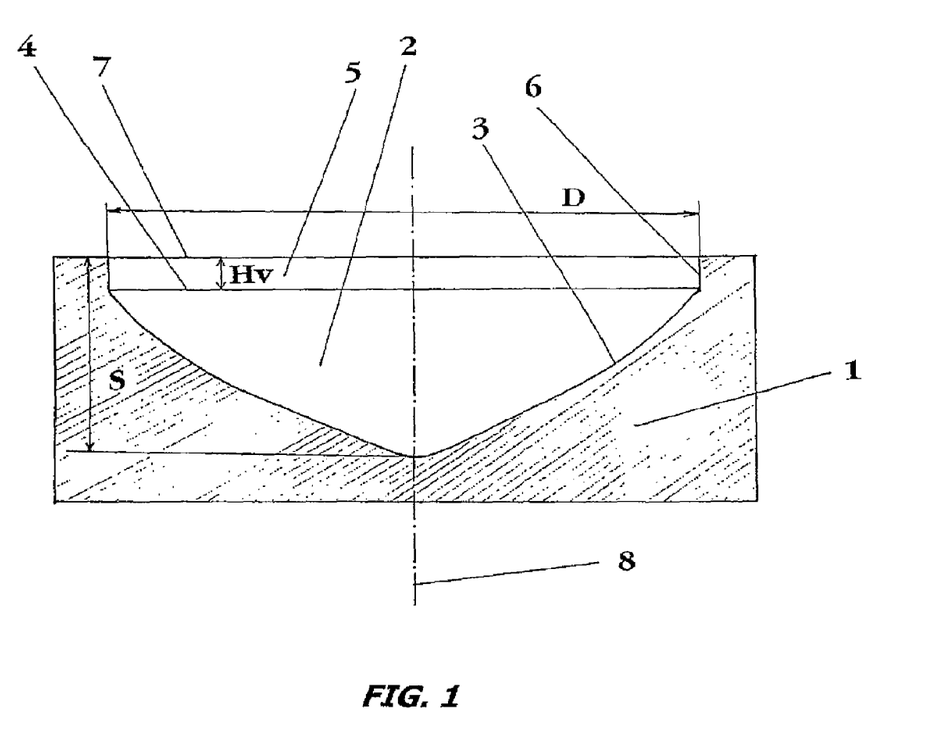
FIG. 1 is a preferred cross-section of the mold according to the invention, whose cavity is formed by a combination of an open concave cavity and a transitional open cylindrical cavity.

An advantageous design of an open mold for the execution of the methods according to the invention is depicted in FIG. 1. Open mold 1 contains, first, the open concave cavity 2, which is defined by the functional shaping concave inner surface 3 and the intermediate circular edge 4, and second, by the transitional open cylindrical cavity 5, defined by the functional shaping cylindrical inner surface 6, intermediate circular edge 4 and the peripheral circular sharp edge 7. Both the inserted circular edge 4 and the peripheral circular sharp edge 7 lie in planes, which are perpendicular to the vertical axis 8 of the cavity of the open form 1. The distance of these mutually parallel planes determines the height Hv of the transitional open cylindrical cavity 5; the distance of the plane on which the peripheral circular sharp edge 7 lies, from the cross-section of the vertical axis 8 of the cavity of the open mold 1 with the functional shaping concave inner surface 3 determines the sagital depth S of the cavity of the open mold 1; and the diameter of the circle, which is created by the peripheral circular sharp edge 7, determines the peripheral diameter D of the cavity of the open mold 1. The body of the open mold can be made of various materials, however the most advantageous material is a plastic. Of plastics, the most advantageous are polyolefins, such as polyethylene or polypropylene. The material, from which the open mold is made, is chosen so that is not easily wettable by the liquid polymer precursor. The wetting angle is preferentially higher than 30°, and even better, higher than 90°. The open mold can be, preferentially, designed for single use and made by injection molding.

The functional shaping surface of the cavity of the open mold does not necessarily have to be symmetrical. It can, in principle, have any shape desired as long as the inserted circular edge 4 and the peripheral circular sharp edge 7 are indeed circular. The open mold cavity can be created by a combination of a spherical and a cylindrical plane, for example, such as necessary for the compensation of astigmatism. However, the most usual are rotationally symmetrical surfaces with the axis of symmetry identical with the vertical axis 8 of the open mold cavity. The most advantageous are planes created by the rotation of a part of a conical section, including a circle, ellipse, parabola, hyperbola, or their various combinations. Various parts of the functional shaping surfaces of the open mold cavity can be formed by the rotation of various curves. Thus can be, for example, the central part of the inner shaping surface of the open mold cavity formed by a spherical surface, while the remainder of the inner shaping surface toward the edge of the open mold cavity can be formed by truncated cone surface. Another example are surfaces composed from concentric segments with various curvatures, enabling the creation of a bifocal or a polyfocal intraocular lens.

In the scope of the invention, the most advantageous are smooth surfaces created by the rotation of one continuous curve, which has the lowest radius of curvature in the proximity of the vertical axis 8 of the open mold cavity and whose radius of curvature gradually increases with the increasing distance from the abovementioned vertical axis 8. Such an advantageous surface can be created by the rotation of a hyperbola, which can be approximated in the following equation using the orthogonal coordinates X and Y:

$$Y = -a + (a/b) \cdot (b^2 + X^2)^{0.5},$$

where $$a = R_c \cdot (1+h)^2$$

$$b = R_c \cdot (1+h)$$

while $R_c$ is the center curvature radius and h is a parameter defining the asphericity of the surface. Parameter h can be chosen in the interval from −1 to +infinity. The curve described by the equation (1) approaches a straight line, when h approaches −1, and it approaches a circle, when H approaches +infinity. Within the scope of the invention, the most advantageous values of h are between −0.75 and +1, when the resulting surface is significantly aspherical and its optical power decreases from its maximum central value toward its minimum peripheral value. Intraocular lens created under these conditions is then polyfocal. Apshericity and polyfocality are enhanced with a lowering value of the parameter h. Molds for rotational casting of contact lenses usually have a cavity in the shape of a spherical cap and the value of the parameter h in their case approaches infinity. This proves, that known molds for contact lenses and molds for implantable lenses according to the invention are not mutually interchangeable even from this point of view.

The value of the center radius of curvature $R_c$ is chosen in the interval from 2 to 20 mm, advantageously from 2.5 to 5 mm. Once again it is necessary to emphasize, that the mold with a cavity of such shape would be entirely unusable for the casting of contact lenses, while conversely, the shapes of open mold cavities used for contact lenses are not usable for the production of intraocular lenses according to the invention.

Figure 2:
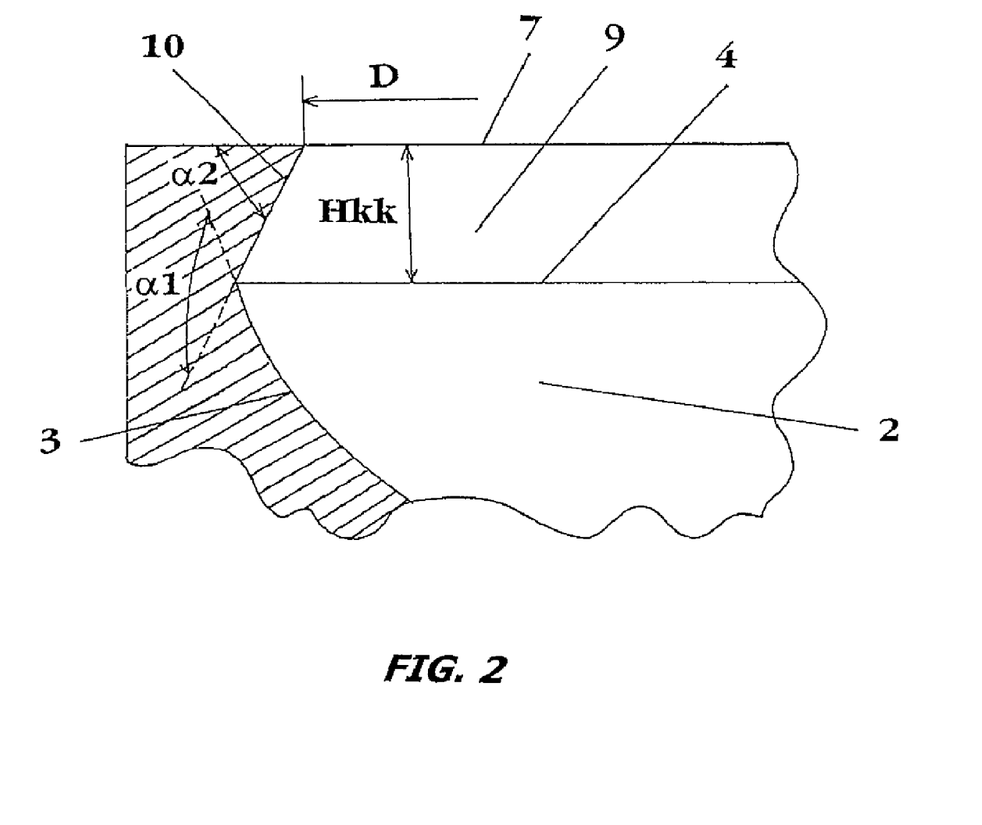
FIG. 2 is a partial cross-section of another preferred open mold according to the invention, whose cavity is formed by the combination of an open concave cavity and a transitional open frustum-of-a-cone cavity.

The shape of the edge of the open mold's cavity according to the invention is important both for the production process and for the function of the resulting implantable intraocular lens. The advantageous shape of the edge of the cavity of the open form 1, according to the invention, is depicted in FIG. 2, which depicts a partial section of the edge of the open mold. It is apparent in FIG. 2 that the cavity of the open mold 1 is in this case created, first, by the open concave cavity 2, defined by the functional shaping concave internal surface 3 and it's intermediate circular edge 4, and second, by the transitional open frustum-of-a-cone cavity 9, that is defined by the intermediate circular edge 4 by the peripheral circular sharp edge 7, and the functional shaping frustum-of-a-cone inner wall 10. The slopes of the functional shaping concave surface 3 and the functional shaping frustum-of-a-cone inner wall 10 are defined in FIG. 2 by angles $\alpha_1$ and $\alpha_2$, while angle $\alpha_1$ ranges advantageously from 75° to 175°, even more advantageously from 90° to 105°, while angle $\alpha_2$ ranges advantageously from 60° to 135°, and even more advantageously from 75° to 105°. The peripheral diameter of the cavity D ranges from 5 to 10 mm, advantageously from 7 to 9 mm. The sagital depth of cavity S ranges advantageously from 0.75 to 5 mm, even more advantageously from 1 to 2.3 mm.

It is necessary to emphasize again, that open molds of these dimensions are entirely unsuitable for rotational casting of contact lenses, because the peripheral diameter of molds used for contact lens production generally ranges from 13 to 17 mm. The volume of cavity $V_c$ of the open mold can be calculated as the volume of the space defined by the functional shaping inner surface of the open mold cavity and the plane of the peripheral circular sharp edge of the open mold. This volume of cavity $V_c$ advantageously ranges, in case of an open mold according to the invention, between 15 and 175 μl, even more advantageously between 25 and 55 μl. Open molds for contact lens production have much higher volumes of the cavity $V_c$, generally between 200 and 600 μl.

The metered volume $V_1$ of the liquid polymer precursor can be changed in a broad range in dependence on the geometry of the mold, but as a rule it ranges from approx. 10 to approx. 100 ul. If $V_1 < V_c$, then the liquid polymer precursor does not reach the peripheral circular sharp edge in a stationary mold. Rotation of the open mold is in this case necessary to wet the whole functional shaping inner surface of the open mold cavity. However, the contraction of polymer precursor during solidification, which generally accounts for approximately 20% of the volume, would cause the liquid in the open mold retract from the peripheral circular sharp edge. Therefore, this would result in rendering the shape of the intraocular lens worthless. This undesirable phenomenon can be prevented by rotating the open mold at a sufficiently high rate of rotational speed. Contraction during solidification can be characterized by a contraction factor C, which is the ratio of the specific gravities of the polymer precursor before and after solidification ($d_m$ and $D_p$): $C = d_m/d_p$.

The value of the contraction factor C can change across a wide range from about 0.8 to a value close to 1. Overall it is desirable, that the dosed volume $V_1$ of the liquid polymer precursor was in a particular ratio to the volume of cavity $V_c$. This filling ratio $Z = V_1/V_c$ ranges from about 0.75 to about 2, advantageously from about 0.95 to about 1.5. As a matter of comparison, the filling ration used in case of contact lenses is $Z \ll 0.5$, typically in the interval of values from 0.05 to 0.2. It can be then stated, therefore, that the values of the filling ratio are much higher for implantable lenses according to the invention, than values useful for contact lens production using rotational casting, whereas conversely, the values of the filling ratio usual for contact lenses are not usable for the method of intraocular lens production according to the invention.

The surface quality of polymers created in open stationary molds is often bad due to uneven course of polymerization, which leads to uneven contraction and thus to surface deformation. This is a problem especially in case of cross-linking polymerization, where the polymerization rate increases significantly with viscosity, that is with the rate of reaction conversion. This increase of reaction rate in especially sharp at gel-point, where a three-dimensional continuous network is just created, which is known as the so-called Trommsforf Effect. This undesirable phenomenon is significantly limited by the rotation of the mold, even at very low rotation speeds. On one hand the speed of initiation is equalized throughout different parts of the cavity, on the other hand, the rotation helps to stabilize the shape of the liquid surface. Both influences cause the quality of the product's surface to be greatly improved as a result of rotational rather than stationary casting. Centrifugal force developed by the mold's rotation spreads the liquid polymer precursor in the direction away from the vertical axis of the open mold cavity and toward the edge of the open mold, until the edge of the level of liquid polymer precursor reaches the perimeter circular sharp edge of the open mold and remains in contact with the peripheral circular sharp edge until the solidification of the polymer precursor, i.e. until such viscosity of the form's fill is reached at which the precursor practically does not flow and remains in contact with the peripheral circular sharp edge even in the case that the rotation of the mold ceases. In case of cross-linking polymerization, this state already occurs at lower degrees of conversion, for instance at a degree of conversion of 3-5%.

Figure 3A:
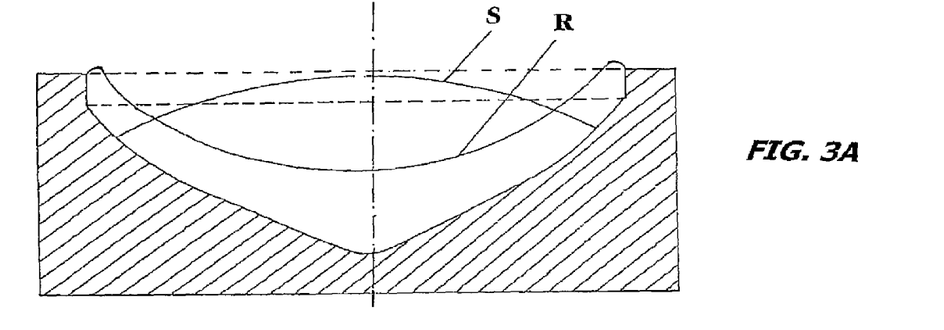
FIGS. 3A to 3C are schematic views of rotational casting in an open mold according to the invention at various levels of filling of the open mold by a liquid polymer precursor.
Figure 3B:
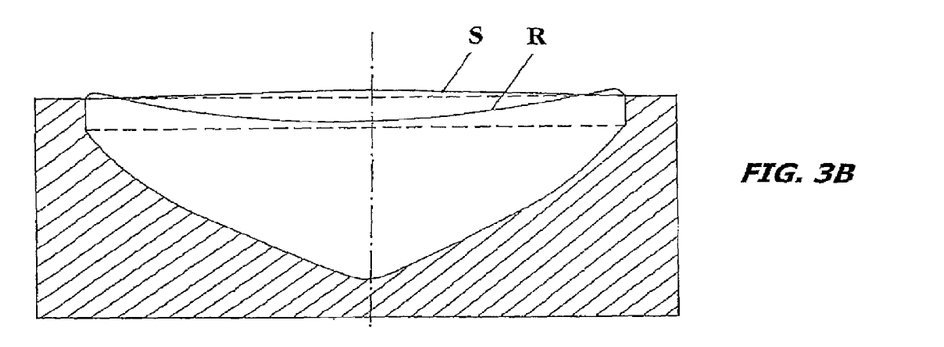
Figure 3C:
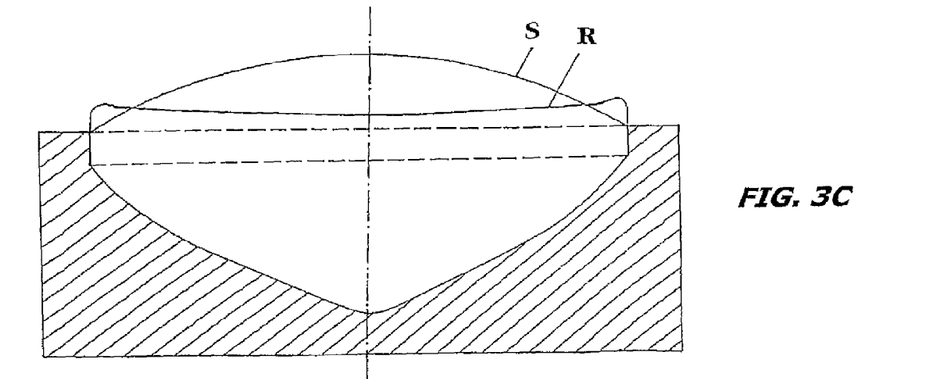

This is represented schematically in FIGS. 3A to 3C, in which the open mold according to the invention was already described in detail in reference to FIG. 1. The cavity of this open mold is created by a combination of an open concave cavity and a transitional open cylindrical cavity.

FIG. 3A demonstrates a situation where the filling ratio is $Z<1$, where the volume of cavity $V_c$ of the open mold is higher than the metered volume $V_1$ of the liquid polymer precursor. The liquid polymer precursor occupies the stationary surface S in an open resting mold, and a rotational surface R while the mold is being rotated at a speed, at which the level of liquid precursor reaches the peripheral circular sharp edge. As evident from FIG. 3A, the original convex meniscus of the liquid will change to a concave. As long as $Z=V_1/V_c<1$, the rotational speed of the open mold must be relatively high and the front surface of the manufactured intraocular lens will be concave with a negative refractive power. With the increasing rotational speed of the open mold, with the increasing peripheral diameter D of the open mold's cavity, with the lowering contraction factor C and with the lowering filling ratio $Z=V_1/V_c$, the concavity of the front wall of the intraocular lens will increase, and with it the overall positive optical power of the lens will decrease.

FIG. 3B demonstrates a situation with a filling ratio $Z=1$, therefore the one where the metered volume $V_1$ of the liquid polymer precursor is exactly equal to the volume of the cavity $V_c$ of the open mold. In this case a stationary planar surface S will be formed in the stationary open mold. During mild rotation around the vertical axis of the open mold, the rotational surface R has a slightly concave meniscus in the center of the surface, and at the edges the surface slightly exceeds the peripheral circular sharp edge of the open mold. In this case, rotational surface R has inflexion points. The speed of rotation of the open mold is chosen such that the contact of the liquid polymer precursor and the peripheral circular sharp edge is guaranteed but that the liquid polymer precursor does not spill over the peripheral circular sharp edge in the process. The chosen rotational speed of the open mold will depend on a number of parameters, among which are especially the volume $V_c$ of the cavity, dosed volume $V_1$ of the liquid polymer precursor, specific gravity of the liquid precursor before and after solidification, surface tension of the liquid precursor, and the wetting angle between the liquid polymer precursor and the functional shaping inner wall of the open mold's cavity. In course of the polymerization, the concavity of the level will become more pronounced due to the contraction and a slightly convex/concave implantable lens will thus be created.

In a case where the filling ratio $Z=V_1/V_c>1$ and $Z \cdot C=1$, then at low rotational speeds of the open mold an intraocular planar/convex lens can be obtained, with an approximately zero optical power of the front side. The increase in rotational speed of the open mold will result in a concave front wall of the intraocular lens with a negative contribution to the overall optical power. These conditions are specific for intraocular lenses, because they cannot occur during contact lens production.

With the increasing rotational speed of the open mold, with increasing peripheral diameter D of the cavity, with decreasing contraction factor C and with a lowering filling factor $Z=V_1/V_c$, the front side of the intraocular lens will decrease in convexity and possibly increase in concavity, which will also lower it's positive optical power.

FIG. 3C demonstrates a situation, during which the filling ratio is $Z>1$, and therefore where the dosed volume $V_1$ of liquid polymer precursor is higher than the volume $V_c$ of the open mold cavity. If the surface of the mold is not wettable or is at least poorly wettable by the liquid polymer precursor, then even in this case the liquid polymer precursor will not overflow over the peripheral circular sharp edge of the open mold. A convex meniscus will formed and the liquid polymer precursor will reach a stationary surface S. As long as the condition $Z \cdot C>1$ is maintained, a biconvex intraocular lens will be formed through either polymerization or cross-linking. During the rotation of the open mold along the vertical axis, the level of liquid polymer precursor will change its profile, and will reach a rotational surface R, whilst at higher rotational speed of the open form a planar or even a mildly concave central area will be created. In this case the level of liquid polymer precursor at low rotational speeds of open mold, just as at a zero rotational speed of the open mold, is essentially formed by a flat ellipsoid, which has, as was already stated, a high spherical aberration. Increasing the rotational speed of the open mold will result in the lowering of the convexity of the central area of the intraocular lens, possibly even attaining a planarity or concavity of the central area of the intraocular lens. This leads to the decrease of the spherical aberration of the lens in this critical central region.

Figure 4:
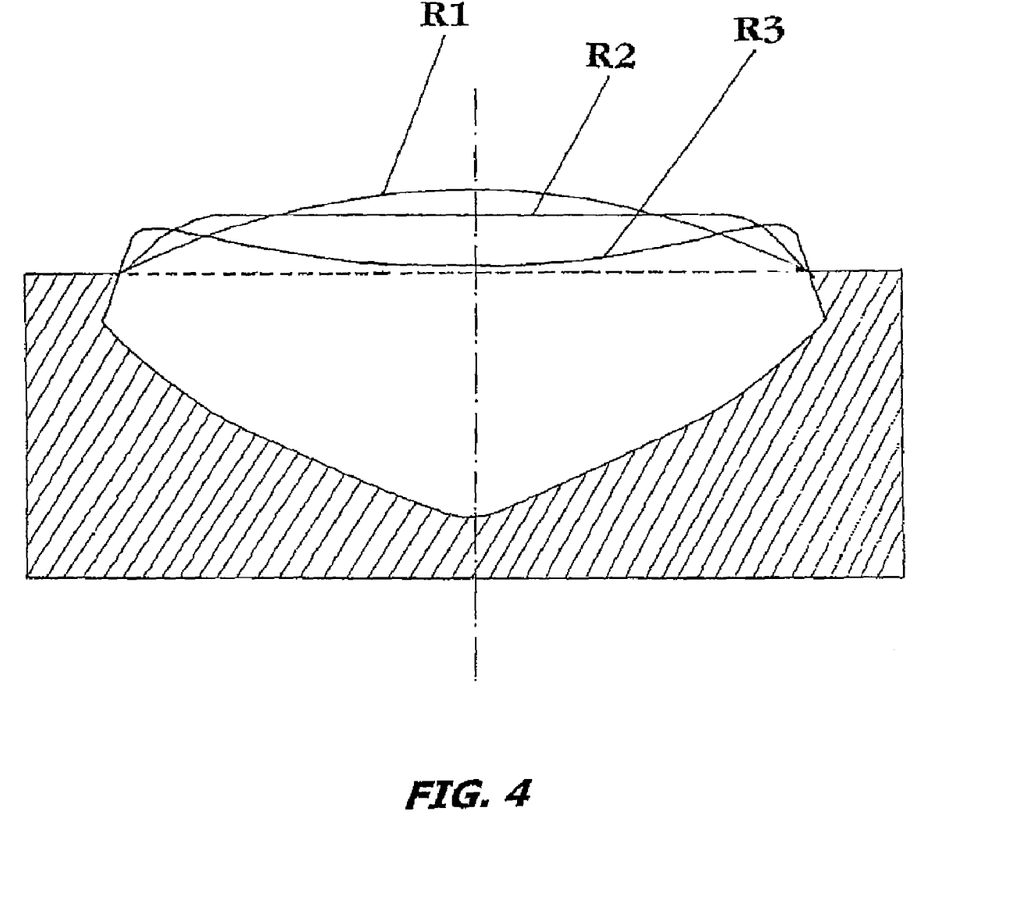
FIG. 4 is a schematic representation of rotational casting in an open mold according to the invention at various rotational speeds of the open mold.

This is schematically depicted in FIG. 4, on which there is a picture of an open mold, which was essentially already described in reference to FIG. 2, and whose cavity is created by a combination of an open concave cavity and a transitional open frustum-of-a-cone cavity. The surface of the liquid polymer precursor will assume rotational surface R1 at low rotational speeds of the open mold, at medium speeds of the rotation of the open mold a rotational surface R2 and at high rotational speeds of the mold rotational surface R3. The highest usable rotational speed of the open mold is limited by the centrifugal force value at the edge of the cavity of the open mold, which may not exceed the cohesive force of the liquid polymer precursor resulting from it's surface tension. If this highest usable rotational speed of the open mold is exceeded, it will cause the liquid polymer precursor to spill over the peripheral circular sharp edge and the contents of the mold will be rendered worthless. The rotational speed of the open mold, at which the overflow of the liquid polymer precursor occurs, is a critical parameter, whose value is specific for each given individual open mold and for each given specific polymer precursor.

Rotation during casting in open molds affords many advantages. Most of all, it improves the filling of the open mold with the liquid polymer precursor in the region of the intermediate circular concave edge. Because the material, from which the mold is made, is not easily wettable by liquid polymer precursor and this poor wettability is desirable for the maintenance of a positive meniscus by the peripheral circular sharp edge, the area of the open mold in the region of the inserted circular edge has a tendency to trap air bubbles during stationary casting, which prevents the creation of a continuous sharp intermediate convex edge of the manufactured intraocular lens. This intermediate convex edge, which is formed by the intermediate circular edge of the cavity of the open mold, is important to the function of the interocular lens, because it prevents the migration of cells along the lens and limits the occurrence of the phenomenon, known by the acronym PCO (Posterior Capsule Opacification; clouding of the posterior capsule after implantation) and which will be explained in further detail below. The rotation of the open mold generates a centrifugal force, which acts against the functional inner surface of the cavity and which thus helps to force air out using the liquid precursor in this area. For this reason, it is possible to form a sharper intermediate edge of the intraocular lens by rotational casting than in case of lenses manufactured by stationary casting. Molds for contact lenses do not have an inserted circular edge at all, because in case of a contact lens, the corresponding sharp inserted edge of the lens would be highly undesirable.

Besides, the rotation of the open mold improves the quality of the peripheral edge of the intraocular lens, which is formed by the peripheral circular sharp edge of the open mold cavity, and which is desirable for the biocompatibility of the intraocular lens. Liquid polymer precursors often have a tendency not to entirely reach the peripheral circular sharp edge of the open mold, which occurs especially during lower values of the filling ratio Z and at low wettability of the material, from which the open mold is manufactured. This leads to the formation of an irregular, jagged peripheral edge of the intraocular lens, which is not permissible for the desired function of the intraocular lens. The centrifugal force caused by the mold rotation, acting against the functional shaping inner surface of the open mold cavity, will push the whole edge of the liquid polymer precursor surface to the peripheral circular sharp edge position of the open mold, even at low rotation speeds of the open mold, which contributes in a decisive manner to the attainment of the required quality of the peripheral edge of the intraocular lens.

Rotation of the open mold also positively affects the shape of the meniscus, because it shifts a portion of the liquid polymer precursor from the central area into peripheral areas and thus it flattens the central optical zone of the front side of the intraocular lens. Through this, a lessening of the spherical aberration of the front side of the intraocular lens will be attained, especially in the critical central optical zone.

Rotation of the open mold changes the central curvature of the front side of the intraocular lens, and thus it also changes it's optical power. On account of this, one type of an open mold can be used for the manufacture of intraocular lenses of various optical powers, and this lowers the manufacturing cost.

The rotation of the open mold also improves the optical quality of the front side of the lens, because it creates more uniform conditions for initiation, especially in the case of photoinitiation, and it thus prevents uneven contraction of the content of the open mold that would otherwise lead to surface irregularities of the manufactured intraocular lens.

The speeds of rotation of the open mold can vary in various phases of the casting process. For instance, the rotation can be slower in the beginning and the rotation axis does not need to be vertical, which will achieve a more uniform wetting of the functional shaping inner surface of the open mold cavity by the liquid polymer precursor, and this will support its' uniform spreading along the functional shaping inner wall of the open mold cavity. The rotation can then be speeded up in order to achieve a desired shape of the meniscus, or it can be slowed down and possibly even stopped, in case where the whole edge of the level of the liquid polymer precursor reached the peripheral circular sharp edge of the open mold and that this position of the edge of the level of the liquid polymer precursor is already stabilized by the increased viscosity of the liquid polymer precursor as a result of its' polymerization and/or cross-linking.

Rotational casting can be performed in various types of open molds and using modified equipment for the rotational casting of contact lenses, which are described, for instance, in the U.S. Pat. Nos. 4,517,138, 4,517,139, 4,517,140, 5,300, 262, 5,435,943, 5,395,558, 5,922,249 and 5,674,283.

After the solidification of the liquid polymer precursor, the manufacturing of the intraocular lens is more or less complete. As opposed to other manufacturing processes for intraocular lens manufacture, the method according to the invention does not require mechanical operations, such as machining, lathing, filing and polishing of the obtained intraocular lens. According to the invention, the intraocular lens can be essentially made in one manufacturing step and without contact with a human hand. This is a significant advantage of the method according to the invention, because through this its' biocompatibility improves and the possibility of damage to the surface or the contamination of the intraocular lens is lowered.

The material, from which the open mold is made, can be selected so it has low adhesion to the resulting cross-linked polymer. In such a case, manufactured intraocular lenses can be removed out of the mold without a previous hydration. This, however, poses a risk to the intraocular lens, especially to its' delicate edges, which can be easily damaged due to the fragility of the dehydrated material. It is therefore advantageous to hydrate the manufactured intraocular lens directly in the open mold, in which the intraocular lens was made. The hydration will soften the intraocular lens and further, it will lower its' adhesion to the functional shaping inner wall of the open mold cavity, therefore the intraocular lens will separate from the mold by itself.

The intraocular lens can then be rid of residual monomers and other impurities using extraction, using common methods, which were developed for various types of implantable materials. The intraocular lens can also has its' surface chemically modified to further improve its' properties, such as especially biocompatibility and the adhesion to tissues. One of the possibilities for such surface modification is partial surface hydrolysis while using basic or acidic catalysts, described, for instance, in U.S. Pat. Nos. 3,895,169, 4,997, 441, 5,080,683, 5,158,832 and 5,939,208.

The intraocular lens is finally packaged and sterilized using an appropriate method, for example steam sterilization.

The method according to the invention can be used for the manufacture of various types of implantable intraocular lenses, such as are intraocular lenses designed to be implanted into the posterior chamber of the eye, intraocular lenses designed for the implantation into the anterior chamber of the eye or intraocular lenses designed to be implanted into the stroma. Such intraocular lenses can be manufactured using various types of cross-linked polymers. Especially advantageous implantable lens, which perfectly utilizes the advantages afforded by the method according to the invention and thus it simultaneously affords large advantages for patients, is characterized by at least some of the following characteristics.

- The optical zone is of a large diameter, typically between 6 and 9 mm. Large optical zone is of a large advantage for vision, especially at night, when the iris is dilated and the edge of a small optical zone falls into the optical path in lenses made in current state of technology, and causes reflections, blinding by too much light, loss of contrast, or other undesirable effects.
- Aspherical polyfocal optics with a maximum positive optical power in the middle, gradually falling in the direction of the edges. This type of optics compensates spherical aberration, has high depth perception and can cause pseudo-accommodation, especially the adjustment for long-distance vision under poor-light conditions.
- Smooth and continuous convex rear side of the intraocular lens fits well into the rear capsule of the original lens. This helps to keep the rear capsule naturally taut, and this lowers the incidence of clouding of the rear capsule after implantation.
- Whole surface of the intraocular lens, with the exception of the peripheral edge and possibly the intermediate edge, is continuous, i.e. without breaks and ridges. This improves both the optical quality and the biocompatibility of the lens.
- The sharp and uninterrupted intermediate ridge of the intraocular lens, in contact with the posterior capsule, limits cell migration into the space between the lens and the capsule, and thus it lowers the incidence of the posterior capsule opacification after implantation.
- Axial deformability of the intraocular lens. Because of its' shape, the intraocular lens can be deformed using front-back pressure of inner-eye structures, comprising the cilliary body, the zonules and the vitreous body, and thus allowing the change the curvature of its surfaces and making it possible to simulate the natural accommodation of the eye. Intraocular lenses of other shapes, falling under the current state of technology, do not have this capability and have to depend on their displacement in the front-rear direction; therefore the pseudo-accommodation ability are significantly worse in their case.
- A relatively high water content in the equilibrium state with inner-eye fluids. Under these conditions, the water content is higher than 30% of mass, and advantageously higher than 40% of mass. High water content enables dehydration during deformation and thus the creation of a refractive index gradient, which further increases optical power and contributes to pseudo-accommodation. High water content also lowers surface reflectivity of the lens, increases its' biocompatibility, and enables its' implantation through a smaller surgical opening, and that in a partially or wholly dehydrated state.
- The hydrogel of the poly(hydroxyethylmethacrylate) type containing carboxyl groups, especially cross-linked copolymers containing 2-hydroxyethylmethacrylate and methacrylic acid. The content of carboxyl groups is advantageously between 0.25 and 7 mol. %, and especially advantageously between 0.3 and 3 mol. %. Even though it is often stated that methacrylic acid is not desirable in contact or intraocular lenses, because it binds $Ca^{2+}$ and causes calcification, in the scope of the invention it was shown to be quite the opposite. It appears that the carboxyl groups suppress calcification, which can be observed in certain hydrogels, and overall they improve the biocompatibility of the hydrogel. Carboxyl groups can be introduced into the hydrogel in the course of its' preparation during the copolymerization of the basic monomer with acrylic or methacrylic acid, or it can be generated in an already finished hydrogel by using partial hydrolysis of ester groups. Hydrolysis can be catalyzed by both acids or bases.

In the following part of the description, the invention will be further elucidated using examples of it's specific execution. These examples are only meant to illustrate, and they do not limit the scope of the invention any way, because it is clearly delineated by the definition of the present claims and the contents of the present description.

EXAMPLES

Example 1 (Comparative)

Figure 5:
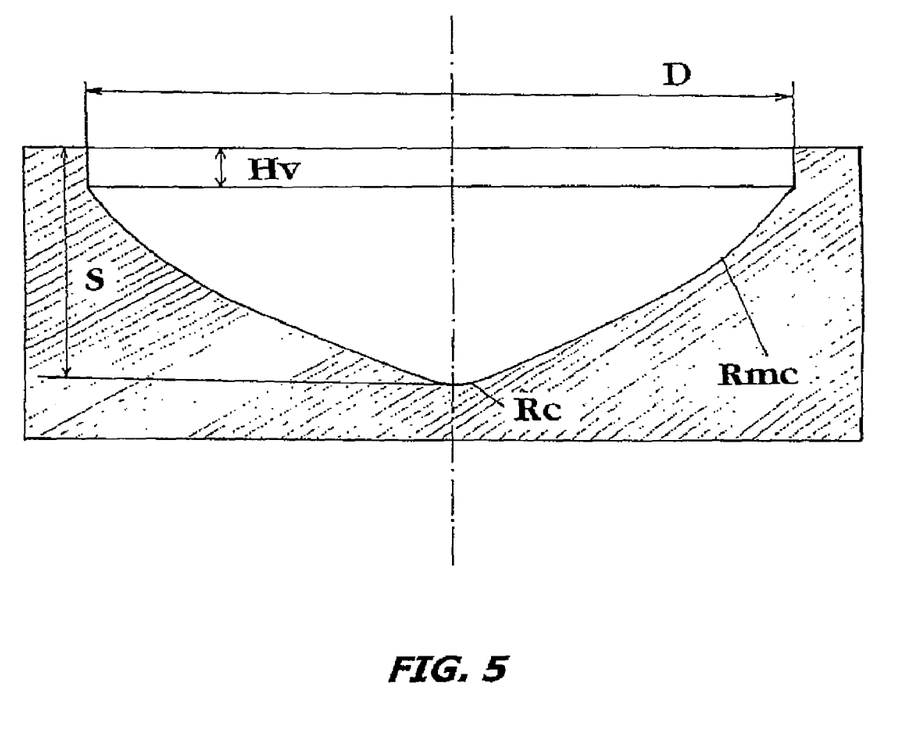
FIG. 5 is a sectional view of a preferential specific open mold according to the invention.

For the production of intraocular lens, an open mold was used, which is schematically depicted in a cross-section in FIG. 5, and which has the following parameters:
diameter at edge D=7.75 mm
sagital depth S=1.34 mm
center curvature radius Rc=3.50 mm
radius of curvature outside of the center Rmc=9.10
height of the transitional open cylindrical cavity Hv=0.05 mm
angle $\alpha_1$=135°,
angle $\alpha_2$=90°,
volume of cavity Vc=37.1 µl,
and a monomer solution of the following composition by weight:
2-hydroxymethacrylate 98.6%
ethylglycoldimethacrylate 0.25%
diethylenglycoldimethacrylate 0.1%
triethylenglycoldimethacrylate 0.1%
methacrylic acid 0.4% and
diisopropylcarbonate 0.5%.

This basic monomer mixture is combined with glycerol using the ratio of 9 weight units of monomer mixture to 1 weight unit of glycerol. The obtained monomer mixture is purged with argon for a period of 2 minutes, after which the cavity of the open mold defined above is filled with 45 µl of the above described monomer mixture. The open mold with the monomer mixture is then heated to a temperature of 70° C. for a period of 6 hours without the open mold being rotated. The obtained hard xerogel intraocular lens is inspected prior to its removal from the open mold. The central part of its meniscus is partially indented due to the influence of contraction, and somewhat wavy. The waviness is uneven and has a form of either concentric circles, or accordion pleats. The edge of the intraocular lens is somewhat uneven and partially deformed, with incorporated bubbles. The intraocular lens is allowed to swell in the open mold using 1% solution of sodium bicarbonate, and then it is removed from the open mold and extracted 10 times in an excess of a 0.9% solution of sodium chloride. The water content inside the intraocular lens after the last extraction amounts to 42% by weight, and in a uniformly swollen intraocular lens, the dimensions are as follows: diameter 8.9 mm, center thickness 1.4 mm.

Optical strength of the intraocular lens was measured on the NIKON PL2 instrument, during which process the intraocular lens was immersed in a isotonic salt solution and at aperture 3 mm. Even at the best attainable focusing of the intraocular lens, the measuring cross-hairs were blurred due to the deformation of the optical surface of the intraocular lens, and therefore the measurement could not have been done with sufficient accuracy. The best estimate of the optical power is +15 diopters.

Example 2 (According to the Invention)

The process according to Example 1 is repeated, however glycerol is not added to the basic monomer mixture and the open mold with the monomer mixture is rotated for the first hour of polymerization at a speed of 30 rpm, whereas the rotation of the mold is halted and the polymerization continues under stationary conditions for a period of another 6 hours. Due to the polymerization, the meniscus of the monomer mixture solidifies into a smooth, slightly concave surface after only one hour, and it will not change even after subsequent finishing polymerization, which is done without rotating the open mold. The edges of thus obtained intraocular lens are sharp and clearly defined, without defects visible at a 20× magnification. The intraocular lens has a hydrated-state diameter of 9.4 mm with a central thickness of 1.6 mm. The optical power of the intraocular lens is readily measurable, and the focusing pattern is clear and crisp. The refractive power is +14.75 diopters.

Example 3 (According to the Invention)

The monomer mixture from the Example 1 is modified, so that it's glycerol content is increased to 20% of it's mass, and 35 μl of this mixture is dosed into the open mold cavity. The rotational speed of the open mold is first set for 5 rpm at a room temperature and a tilt of the rotational axis at 30° from the vertical, and then this speed is maintained for a period of 5 minutes. Then the temperature is increased to 70° C., the rotational axis is shifted to a vertical position and the speed of rotation is increased to 360 rpm. The edge of the surface of the monomer mixture rises up to the peripheral circular sharp edge of the open mold, and the open mold is rotated under these conditions for 6 hours under a protective nitrogen atmosphere. Other steps the process are the same as the corresponding steps stated in Example 1. Thus obtained hydrated intraocular lens has a convex/concave shape, a diameter of 8.5 mm, sagital depth of 1.2 mm and a diopter value of +12.5 diopters.

What is claimed is:

1. A method of manufacture of an implantable planar/convex, biconvex, planar/concave or convex/concave lens made from a liquid polymer precursor, which is capable of a transition into a clear, solid polymer state by polymerization and/or cross-linking in an open mold, the mold having a functional shaping inner surface that is separated from the remaining surface of the open mold by a peripheral circular sharp edge with an intermediate circular edge having the shape of a circle lying in the plane parallel to the plane of the peripheral sharp edge into a transitional open cylindrical or frustum-of-a-cone cavity delineated between the peripheral sharp edge and the intermediate circular edge, wherein the transitional open cylinder or frustrum-of-a-cone cavity defines a planar surface at an angle α2 less than or equal to 90°, the functional shaping inner surface being unwettable or incompletely wettable by the liquid precursor, the method comprising the steps of:
a) metering the liquid polymer precursor into the open mold in an amount at which an edge of the surface of the liquid precursor contacting an inner surface of the open mold is located under the peripheral circular sharp edge of the open mold or reaches a peripheral circular sharp edge and at least a part of the surface of the liquid polymer precursor will protrude above the plane defined by the peripheral circular sharp edge of the open mold, or at least a part of the surface of the liquid precursor lies in this plane or the whole surface of the liquid polymer precursor lies below this plane, while in this case the liquid polymer precursor will be metered into the open mold in the amount, which will always be higher than the amount of the liquid polymer precursor needed to obtain a contact eye lens of the same diameter;
b) rotating the open mold, which contains the liquid polymer precursor, around its vertical axis at a speed at which the liquid polymer precursor displaces in the open mold to the extent that the surface of the liquid polymer precursor overtops the plane defined by the peripheral circular sharp edge of the open mold at least at proximity of the peripheral circular sharp edge without draining away from the open mold via over the peripheral circular sharp edge such that an outer edge of the implantable lens has a smooth curvature at or above the peripheral circular sharp edge;
c) exposing the liquid polymer precursor to solidifying conditions, under which it will be able of transformation into a state of a clear, solid polymer by polymerization and/or cross-linking;
d) and the open mold continues to be rotated under the said solidifying conditions at the said speed at least until the time, when the edge of the surface of the polymerized and/or cross-linked liquid polymer precursor reaches the peripheral circular sharp edge of the open mold even if the rotation of the mold was slowed down or stopped;
e) then optionally slowing down the rotation of the open mold or stopping the rotation of the open mold;
f) and the exposure of the contents of the open form to the said solidifying conditions continues at least until the said transition is attained; and
g) whereupon the implantable lens is removed from the open mold.

2. A method according to claim 1, wherein the liquid polymer precursor contains at least one monomer with at least one double bond polymerizable by free-radical polymerization.

3. A method according to claim 2, wherein the free-radical polymerization is initiated by the fission of an initiator containing a peroxide bond or an azo-bond.

4. A method according to claim 2, wherein the free-radical polymerization is initiated by free radicals formed by the action of radioactive or electromagnetic radiation or by the action of accelerated electrons.

5. A method according to claim 2, wherein the monomers with at least one double bond polymerizable by free radicals comprise derivatives of acrylic and/or methacrylic acid.

6. A method according to claim 5, wherein at least one of the derivatives of acrylic and/or methacrylic acid is an ester of a polyhydric compound with at least two molecules of acrylic and/or methacrylic acid.

7. A method according to claim 5, wherein at least one of the derivatives of acrylic and/or methacrylic acid is a salt of the acrylic or methacrylic acid.

8. A method according to claim 2, wherein at least one of the monomers with at least one double bond polymerizable by radical polymerization contains a functional group capable of absorbing electromagnetic radiation in the range between 190 and 500 nm.

9. A method according to claim 8, wherein the functional group capable of absorbing electromagnetic radiation is derived from benzophenone or benztriazole.

10. An implantable planar/convex, biconvex, planar/concave or convex/concave lens manufactured by the method according to claim 1.

11. An implantable planar/convex, biconvex, planar/concave or convex/concave lens manufactured by the method according to claim 2.

12. An implantable planar/convex, biconvex, planar/concave or convex/concave lens manufactured by the method according to claim 3.

13. An implantable planar/convex, biconvex, planar/concave or convex/concave lens manufactured by the method according to claim 4.

14. An implantable planar/convex, biconvex, planar/concave or convex/concave lens manufactured by the method according to claim 5.

15. An implantable planar/convex, biconvex, planar/concave or convex/concave lens manufactured by the method according to claim 6.

16. An implantable planar/convex, biconvex, planar/concave or convex/concave lens manufactured by the method according to claim 7.

17. An implantable planar/convex, biconvex, planar/concave or convex/concave lens manufactured by the method according to claim 8.

18. An implantable planar/convex, biconvex, planar/concave or convex/concave lens manufactured by the method according to claim 9.

* * * * *